June 5, 1956  S. H. NORTON  2,749,194
PISTON RING
Filed April 10, 1953
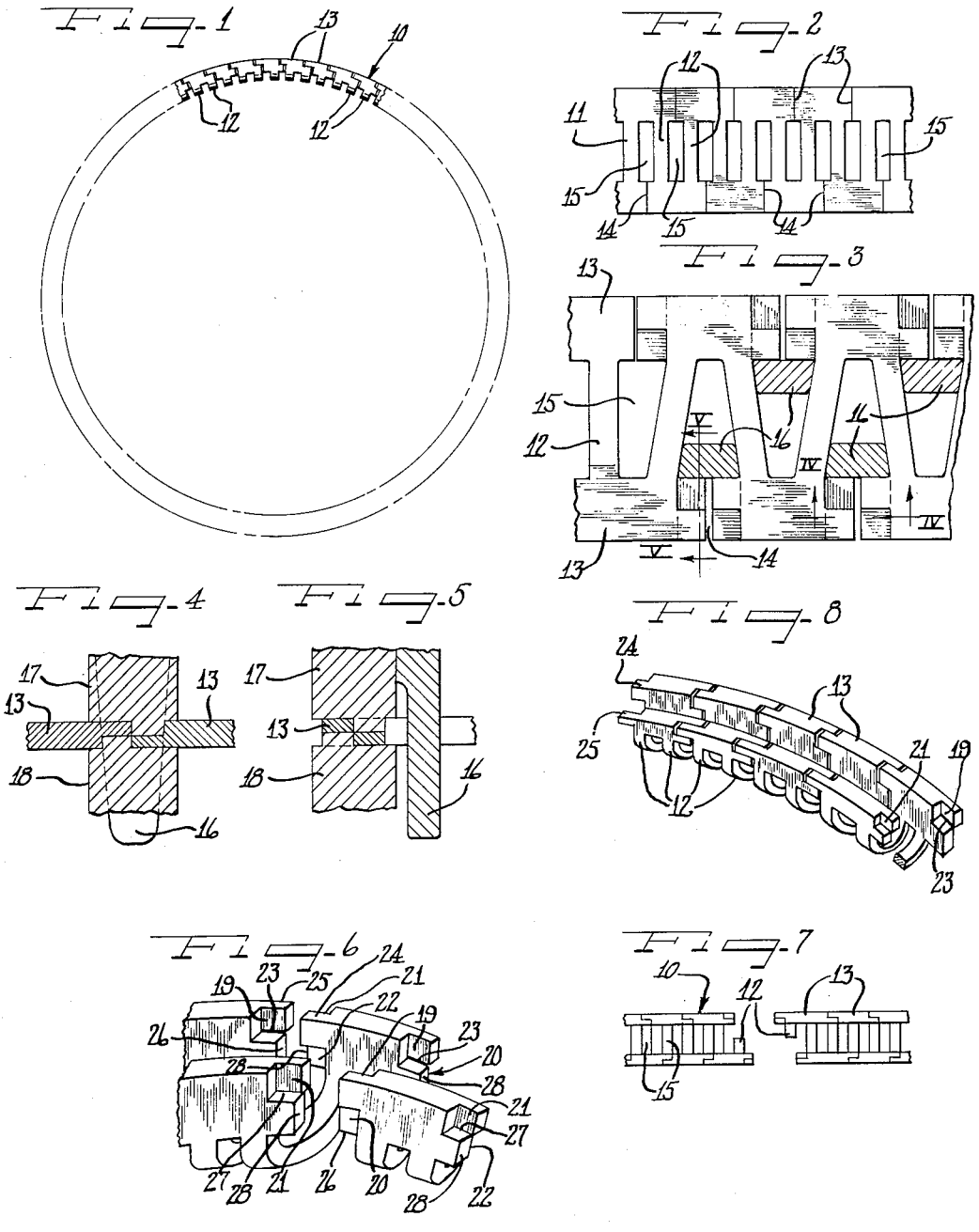
Inventor
Samuel Harry Norton

United States Patent Office 2,749,194
Patented June 5, 1956

2,749,194
PISTON RING

Samuel H. Norton, University Heights, Ohio, assignor to Thompson Products, Inc., Cleveland, Ohio, a corporation of Ohio Application April 10, 1953, Serial No. 347,867

3 Claims. (Cl. 309—29)

This invention relates to improvements in piston rings and more particularly relates to an improved flexible piston ring of the oil control type.

Heretofore, oil piston rings have been made which have a plurality of vertically spaced circumferential oil scraping edges bearing against the wall of a cylinder during reciprocation of a piston therein. The space between the oil scraping edges serves as a reservoir for collecting oil removed from the cylinder wall by the scraping edges, and the gaps between the crossovers at the web at the back of the ring form oil passages which connect the space between the oil scraping edges of the ring with the back of the piston ring groove and return the oil through radial openings in the piston leading to the crankcase. Such oil control rings have been formed from continuous strip steel by a series of blanking, forming in heat treating operations followed by finishing and grinding operations.

Difficulty has been encountered with such rings, however, in that the gaps between the segments forming the oil scraping edges of the ring must be accurately gauged and there is a tendency for the ring to snake or weave in the piston groove with a resultant vibration or chattering thereof. The gaps between the segments may also let the oil pass thereby with the result that where the gaps are not properly gauged there is frequently excessive oil leakage, particularly at the adjacent ends of the ring.

In accordance with my present invention, I provide a flexible piston ring having vertically spaced flanges or segmental elements the outer edges of which form cylinder wiping scavenger elements, and interlock the adjacent ends of the ring against blow-by and excessive oil leakage.

A principal object of the present invention is to provide a simple and improved form of oil control piston ring of the flexible type, made from strip steel and having a plurality of vertically spaced oil scraping elements in which the gaps between the elements are sealed against blow-by and excessive oil leakage.

Another object of my invention is to provide a new and improved method of making flexible piston rings so as to increase the flexibility and circumferential compression thereof, as well as to improve the gas and oil sealing properties thereof.

A further object of my invention is to provide a flexible piston ring having a slotted annular web and spaced oil scraping elements extending therefrom in which the adjacent ends of the oil scraping elements have inter-engagement with each other and are lined up and held from edgewise sliding movement with respect to each other by this inter-engagement.

A still further object of my invention is to provide a novel form of piston ring of the flexible type having a plurality of vertically spaced aligned annular segments locked together at adjacent ends of the ring to provide an oil-tight joint between adjacent ends of the ring when joined together in the cylinder of the engine.

A further object of my invention is to provide a flexible piston ring of the oil control type having all of the advantages of a solid ring in addition to the flexible cylinder wall hugging action of a flexible sectional ring.

A still further object of my invention is to provide a flexible segmental oil control ring so arranged as to avoid the assembling of the ring in the piston and cylinder with one of the ring ends bearing against the cylinder and the other ring end out of engagement with the cylinder, by providing an inter-engaging connection between adjacent ends of the ring.

Still another object of my invention is to provide a flexible piston ring of the segmental oil scraping type having a greater compression length and longer wearing life, with a resultant increase in circumferential spring pressure during the life of the ring.

Another and important object of my invention is to provide a flexible piston ring of the segmental type with the segments supported one on the other so as to make a ring having stiffer oil scraping segments than formerly and to prevent snaking or weaving of the ring in the piston groove, and thus reduce the tendency of the ring to vibrate or chatter in the piston groove.

A still further object of my invention is to provide a flexible piston ring of the oil control type having sufficient radial expansion to fit tightly enough within the cylinder to be used as a compression ring.

These and other objects of my invention will appear from time to time as the following specification proceeds and with reference to the accompanying drawings wherein:

Figure 1 is a fragmentary plan view of a piston ring constructed in accordance with my invention;

Figure 2 is a plan view of a punched and slit strip of piston ring stock from which the ring may be made;

Figure 3 is a plan view of the stock illustrating a step employed in making the piston ring in accordance with my invention;

Figure 4 is a sectional view taken substantially along line IV—IV of Figure 3;

Figure 5 is a sectional view taken substantially along line V—V of Figure 3;

Figure 6 is a fragmentary perspective view of a piston ring constructed in accordance with my invention, showing the ring stretched in order to illustrate the inter-engaging notches accommodating extensible movement of the cylinder wiping elements with respect to each other and supporting one element on the other and maintaining a tight joint therebetween;

Figure 7 is an end view of the ring illustrating the cutting of the ring to accommodate inter-engagement of the adjacent ends of the ring;

Figure 8 is a perspective view of a section of a finished ring.

Referring now more particularly to the drawing illustrating a preferred embodiment of flexible piston ring constructed in accordance with my invention, 10 indicates a flexible piston ring made up from rectangularly punched flat strip steel stock having a web 11 of a ladder-like form having cross bars 12, 12 connecting parallel spaced legs or segmental cylinder wiping flanges or elements 13, 13 together. The legs are alternately slit on each side of the web 11, as indicated by reference character 14 to form the cylinder wiping elements 13, 13. The slits 14, 14 on opposite sides of the web 11 alternately open into transverse slots 15, 15, between the cross bars 12, 12. The slots 15, 15 form oil passages extending radially of the ring and connecting the channel of the ring formed between the legs or cylinder wiping elements 13, 13 with the back of the annular piston ring groove formed in the piston (not shown), to return oil to the crankcase through the oil return passages in the piston, where the piston ring may be used as an oil ring.

The piston ring 10 may be formed from flat strip stock of tool steel, such as S. A. E. 1095 containing 0.95% carbon, which may be hardened after the blanking and forming operations thereof.

In forming the piston ring, a slotted and slit blank of strip steel, like the blank shown in Figure 2, is carried through a spreading and coining stage in a punch press and die or through a rolling mill which spreads the legs or flanged segments 13, 13 apart and coins and alternately notches opposite sides of adjacent ends of each segment to have registering engagement with each other.

The spreading operation may be attained by punches 16 carried by the punch head of a punch press (not shown), or may be lugs extending from the surface of a roll (not shown). The spreader dies may be forced between the adjacent cross bars 12, 12 and may alternately enter the slots 15, 15 adjacent opposite legs 13, 13 at the slit portions thereof, to spread one end of one slot 15 and the opposite end of the next adjacent slot throughout the length of the strip.

At the same time, swedging or coining punches 17 and 18 may engage the adjacent ends of the slit legs or segments 13, 13 and push upwardly and downwardly on each leg, causing the metal to extrude to substantially twice the length of the original projection. This will form notches or recesses 19 and 20 in opposite sides of one end of the leg 13, and corresponding notches 21 and 22 in opposite sides of the adjacent end of the next adjacent leg 13, as shown in Figures 3 and 6.

As shown in Figure 6, one side of one end of one leg is coined slightly more than the other side of the same leg so that the two opposed coining punches 17 and 18 will shear by each other and leave a gap 23 to accommodate engagement of a tongue 24, formed by coining of the notch 21, with a tongue 25 formed by coining of the notch 19, it being understood that the tongue 24 fits within the notch 19 and that the tongue 25 in turn fits within the notch 21. The inner margins of the notches 20 and 22 are defined by tongues 26 and 28 respectively. The notches 21 and 22 are coined to a lesser depth than the notches 19 and 20, to form a web 27 fitting within the gap 23 to close the gap between the notches 19 and 20 and provide an effective seal against gas and oil which may be forced between the overlapping tongues 24 and 25.

The opposite legs 13, 13 are coined in a similar manner, except the end of the leg opposite the notches 19 and 20 has the notches 21 and 22 formed therein while the adjacent end of the next adjacent leg has the notches 19 and 20 formed therein.

The depth of the notches 21 and 22 are therefore less than the depth of the notches 19 and 20, while the associated tongues are correspondingly thinner to accommodate inter-engagement of the tongues 24 and 25 with each other and to provide clearance for the webs 27 on the mating flanged sections of the ring.

After the coining operation, the strip material is pushed together until the cross bars 12, 12 are parallel with each other and the tongues are nested in the associated notches. The material may then be formed into a U by rolling or forming in a die, and may then be reeled and passed through a finish forming and keystoning operation, which keystones the legs into flanged segments or scavenger elements and securely tightens the inter-engaging ends thereof against oil or gas leak. At the completion of the keystoning operation, the strip may be heated, coiled and hardened, drawn to spring temper and then ground and cut off to proper length.

The foregoing finish, keystoning, forming, heat treating, coiling and grinding operations are clearly shown and described in application Serial No. 111,312 filed by me on August 18, 1949, and now Patent No. 2,697,865, issued Dec. 28, 1954 and entitled "Piston Ring Making Machine and Process," so need not herein be shown or described.

In cutting the ring to length, a crossover 12 is cut or punched as shown in Figure 7. This accommodates adjacent ends of the ring to have inter-engagement with each other and to be supported on each other and thus stiffens the ring and seals the adjacent ends of the ring and prevents the loss of oil and gas thereby, and also assures the ring will be properly assembled in the cylinder and piston of the engine.

It should here be noted that since the upper and lower legs are alternately slit, that the inter-engaging connection between one flange or cylinder wiping element, which may be the lower flange or wiping element in the piston is opposite the upper wiping element and that one wiping element has the slot 23 therein while the next vertically spaced wiping element has the web 27 fitting therein.

The slots 23, 23 thus provide clearance for the webs 27, 27 and this sealing connection with the inter-engaging tongues and slots makes it possible to provide for a greater separation than with the standard forms of flexible piston rings, without losing oil in the gaps between the segments or wiping elements of the ring.

It may further be seen that since the spacing between the segmental wiping elements is not critical, due to the sealing of the ring at the gaps, that the ring may be stretched a greater amount than with former flexible piston rings, thus providing an increased compression length of the ring and increasing the resiliency of the ring and the life thereof.

It may further be seen that the inter-engaging connection between the adjacent ends of the segments stiffens the ring and prevents snaking, weaving or vibration or chattering of the ring in the piston groove and assures that the adjacent ends of the ring are assembled into the piston and cylinder with the ends of the ring in slidable engagement with each other and thus assures proper assembly of the ring in the piston and cylinder.

It may further be seen that the ring of my invention may have a far greater outward flexible expansion against the cylinder wall without loosing the gap sealing effect, due to the sealing connection between adjacent ends of the segments or cylinder wiping elements of the ring, and that the ring has sidewise stiffness and all the sections thereof are maintained in alignment with each other.

It may further be seen that the inter-engaging connection between the rings besides preventing the leakage of oil also forms a flexible rim stiff enough and having joints tight enough to form a substantially continuous ring having closed ends, which may be used as a compression as well as an oil ring.

It will be understood that modifications and variations may be effected without departing from the scope of the novel concepts of the present invention.

I claim as my invention:

1. A piston ring comprising a slotted web having parallel spaced annular flanges extending radially outwardly from opposite sides thereof, a plurality of circumferentially spaced slits extending radially of said flanges and separating the same into a plurality of cylinder wiping elements, opposite ends of said elements having alternately arranged notches formed therein on opposite sides thereof, the notches on one end of one element being arranged oppositely from the notches on the adjacent end of the next adjacent element, and a gap between opposite notches on one end of one element accommodating interengagement of the adjacent notched end of the other next adjacent element therewith.

2. A piston ring comprising a slotted annular web having spaced annular flanges extending from opposite sides thereof, said flanges extending radially outwardly from said web and being radially slit at evenly spaced circumferential points along said flanges, and the slit portions thereof being alternately arranged on opposite sides of said web and separating said flanges into a plurality of annular segmental cylinder wiping elements, and said cylinder wiping elements having alternately arranged inner and outer tongues on opposite ends thereof for inter-engagement with each other, to close the gaps between said elements.

3. A piston ring comprising a ladder-like expansible annular web having a plurality of adjacent parallel spaced alternately arranged annular segmental wiping elements projecting therefrom for wiping contact with the cylinder wall of an engine, opposite ends of each of said elements having alternately arranged rectangular notches formed therein, said notches being arranged on one side of said elements adjacent the periphery thereof and on the opposite sides of said elements adjacent the inner margins thereof and said notches on the adjacent ends of said elements being alternately arranged, the notches on one end of one of said elements having communication with each other, and the notches on the opposite end of the same element being separated by a web slidably engaging the communicating passageway between the notches on the adjacent end of the next adjacent element, and the adjacent ends of the end elements of said ring also having alternately arranged registering tongues and notches for slidable engagement with each other.

References Cited in the file of this patent

UNITED STATES PATENTS

| | | |
|---|---|---|
| 1,132,762 | Campbell | Mar. 23, 1915 |
| 2,080,935 | Slyk | May 18, 1937 |
| 2,311,731 | Bowers | Feb. 23, 1943 |
| 2,334,243 | Bowers | Nov. 16, 1943 |
| 2,346,898 | Bowers | Apr. 18, 1944 |
| 2,346,899 | Bowers | Apr. 18, 1944 |
| 2,645,536 | Prasse | July 14, 1953 |